March 24, 1959   F. M. O'BRIEN, JR   2,878,608
GUIDES FOR THE FISHING LINES OF FISHING RODS
Filed Feb. 14, 1956
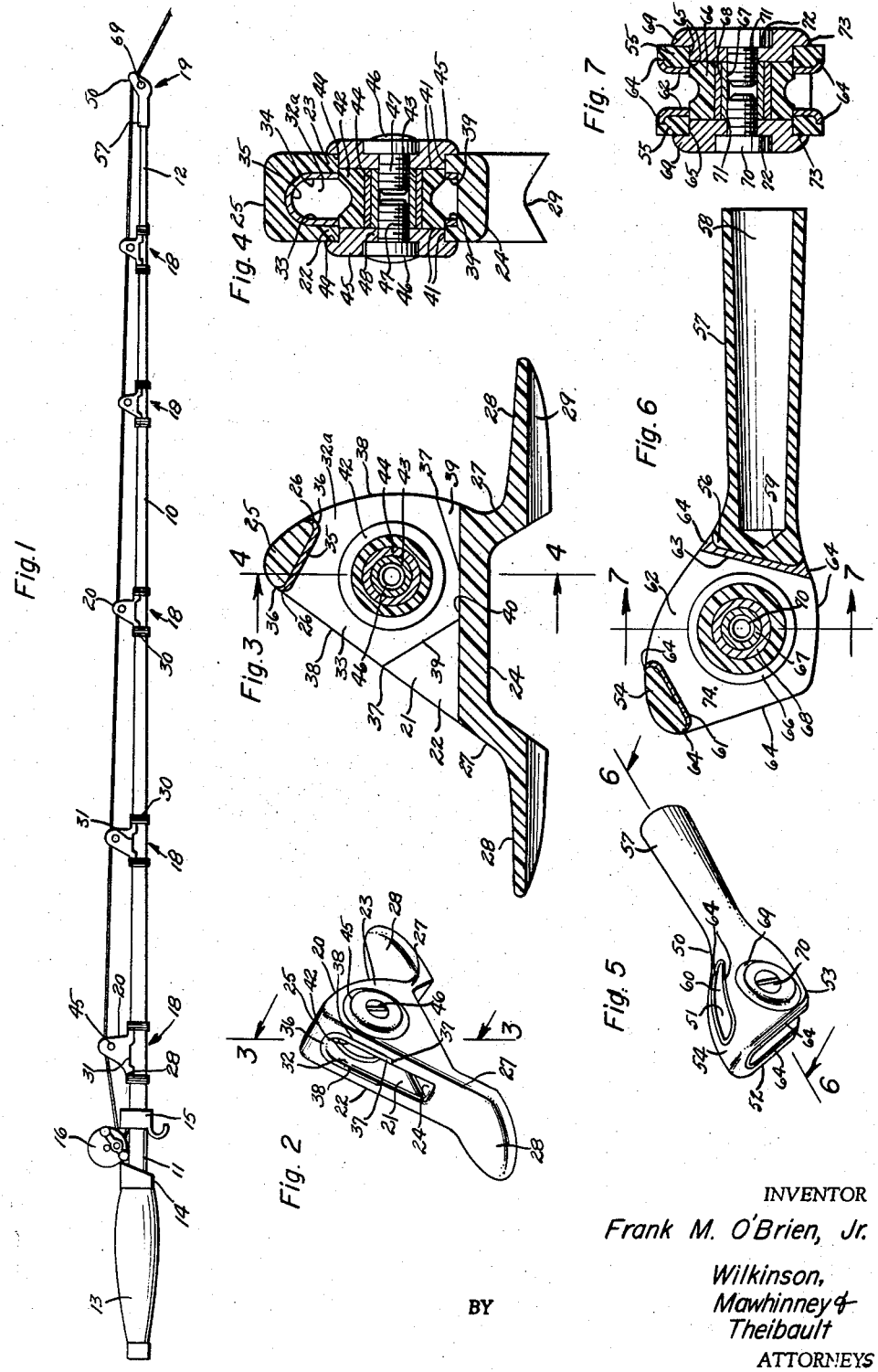
INVENTOR
Frank M. O'Brien, Jr.
BY
Wilkinson,
Mawhinney &
Theibault
ATTORNEYS United States Patent Office 2,878,608
Patented Mar. 24, 1959

2,878,608

GUIDES FOR THE FISHING LINES OF FISHING RODS

Frank M. O'Brien, Jr., Miami, Fla., assignor, by mesne assignments, to Tycoon Finnor Corporation, Miami Springs, Fla., a corporation of Florida Application February 14, 1956, Serial No. 565,418

3 Claims. (Cl. 43—24)

The present invention relates to guides for the fishing lines of fishing rods and has for an object to provide a device of this kind which comprises a series of roller guide assemblies and a roller top assembly for the fishing line.

Another object of the invention is to provide a guide having such characteristics that a plurality of the guides may be mounted upon the fishing rod at spaced apart points along its length without reducing the flexibility and whip action of the rod when being used. This may be accomplished by forming the guide body of a relatively soft material, such as plastic, for example, synthetic resin or nylon which is a synthetic linear condensation polyamide and embedding therein an insert or bushing of relatively hard wear resistant material, such as stainless steel.

The present invention contemplates molding the plastic, such as nylon, around the stainless steel insert or bushing or inserting the bushing into the cast nylon body so that an economy and ease in manufacture will be effected as this is made possible by the use of such a plastic as nylon and the stainless steel insert will protect the nylon from the wearing action of the fishing line.

The present invention also contemplates the provision of a guide of this character having mounted therein a pulley over which the fishing line travels so that the pulley absorbs most of the supporting strain and wear caused by the paying out and reeling in of the fishing line.

A further object of the present invention is to provide a device of this type in which the parts are especially adapted to resist deterioration due to exposure to water and the elements.

With the foregoing and other objects in view, the invention will be hereinafter more fully described and more particularly pointed out in the appended claims.

In the drawings in which the same parts are denoted by the same reference numerals throughout the several views, Figure 1 is a side elevational view of a conventional fishing rod equipped with guides constructed in accordance with the present invention.

Figure 2 is a perspective view of one of the roller guide assemblies.

Figure 3 is a sectional view taken on the line 3—3 of Figure 2.

Figure 4 is a sectional view taken on the line 4—4 of Figure 3.

Figure 5 is a perspective view of the roller top assembly.

Figure 6 is a sectional view taken on the line 6—6 of Figure 5, and

Figure 7 is a sectional view taken on the line 7—7 of Figure 6.

Referring more particularly to the drawing, 10 indicates a fishing rod which may be of the conventional type having a butt section 11 and a tip or top end section 12. The butt section has a hand grip 13 and 14 indicates the fixed member of a conventional reel seat which is secured upon the butt section at the forward end of the hand grip. At 15 is indicated the slidable member of the reel seat which is slidably mounted on the butt section of the rod. A conventional reel 16 may be mounted upon the reel seat and a fishing line 17 is carried by the reel.

In order to support and guide the fishing line 17 during its paying out and reeling in movements, a series of roller guide assemblies, generally indicated at 18, are secured to the rod 10 at spaced intervals along the length thereof between the member 15 of the reel seat and the top end section 12 of the rod and a roller top assembly, generally indicated at 19, is mounted on the top end section 12 of the rod. It will be noted that the fishing rod 10 gradually tapers from its butt section 11 to its tip section 12 so that the roller guide assemblies 18 may be of graduated sizes to accommodate themselves to the size of the longitudinal area of the rod upon which they are mounted.

Referring especially to Figures 2 through 4 of the drawing which illustrate the details of structure of one of the roller guide assemblies 18, each assembly 18 has a substantially triangularly shaped body 20. The body 20 has a through opening 21 of substantially oblong shape in cross section which is defined by side walls 22 and 23, a bottom 24 and an upper wall 25. The bottom 24 is the base and the upper wall 25 is the apex of the triangularly shaped body 20. The opposite edge portions of the upper wall 25 are rounded off as at 26.

A leg 27 extends downwardly and outwardly from each end of the bottom 24 and the adjacent edge portions of the side walls 22 and 23 and terminates in an outwardly extending foot 28. The underface of each foot 28 is transversely curved as at 29 to conform to the shape of the fishing rod 10 upon which it is mounted. The feet 28 may be secured to the fishing rod by wrappings or threads 30 of any suitable type. The legs 27 are of such a length that the contacting surfaces 29 of the feet are entirely disposed below the lower face of the bottom 24 so that when the assemblies 18 are mounted on the fishing rod the bottoms 24 are spaced from the rod as indicated at 31. With this arrangement only the feet 28 engage the fishing rod so that only relatively small spaced apart portions of the rod are bound by the feet and wrappings and accordingly a minimum of rigidity is imparted to the fishing rod and its flexibility is impaired a negligible amount. The body 20 and the legs 27 and feet 28 are formed of a suitable plastic, such as a synthetic resin or cast nylon, that is, a synthetic linear condensation polyamide. The fact that the body, legs and feet are made of plastic minimizes the tendency of the assemblies to interfere with the flexibility of the fishing rod. The body 20, legs 27 and feet 28 may be cast in one piece.

An insert or bushing 32 is positioned within the opening 21 of the body 20 and is made of any appropriate wear resistant material, such as stainless steel. The insert is of substantially inverted U-shape in cross section and its side walls 33 and 34 are secured to the inner faces of the side walls 22 and 23 of the body 20 and its closed end or upper wall 35 is secured to the inner face of the upper wall 25 of the body 20. The insert 32 may be secured to the body 20 by casting the nylon body upon the insert or the nylon body may be first cast and then the insert secured thereto in any suitable manner, as by an appropriate adhesive or the like.

The opposite edge portions of the upper wall 35 of the insert are rolled or peened over as at 36 to cover and protect the rounded edges 26 of the upper wall 25 of the body 20. The upper opposite edge portions of the side walls 33 and 34 terminate short of the lower edge of the side walls 22 and 23 of the body, as indicated at 37, and are rolled or peened over the adjacent portions of the side walls 22 and 23, as indicated at 38, to cover and protect these portions of the side walls 22 and 23. From the point 37 the edge portions of the side walls 33 and 34 extend inwardly and downwardly as at 39 to merge into a substantially flat horizontal portion 40 which engages the bottom 24.

The side walls 22 and 23 and the side walls 33 and 34 of the body 20 and insert 32 have aligned apertures 41 therein for the reception of a grooved roller or pulley wheel 42 which is disposed within the opening 21 of the body 20. The roller 42 is mounted for rotation on a hollow shaft 43 and a bearing 44 is interposed between the roller and the shaft. A button or disk 45 is positioned in the aperture 41 of each side wall 22 and 23 and engages the roller, the hollow shaft and the bearing. A screw 46 has its threaded shank extending through a suitable hole in each button and is received by interior screw threads 47 formed on the inner surface of the hollow shaft 43. The head of each screw 46 is received by a countersink opening 48 formed in each button 45. Each button is stepped to engage the wall of the aperture 41 in its side walls 22 and 23 and to provide an inwardly facing annular shoulder 49 which engages the outer face of the portion of its side wall surrounding the aperture 41 to prevent inward movement of the buttons 45. The side walls 22, 23, 33 and 34 overlie and engage a portion of the periphery of the roller 42.

With this arrangement, the roller assembly is held in proper position against axial and radial displacement. The upper periphery of the roller 42 and the side walls 33 and 34 and the upper wall 35 of the insert 32 define a passageway 32a for the fishing line 17.

Figures 5 through 7 of the drawing illustrate the details of the roller top assembly 19 which has a body 50 having substantially the shape of a trapezium. The body 50 has a through opening 51 which opens through the forward wall 52, the bottom wall 53 and the upper wall 54. The opening 51 is defined by the upper wall 54, side walls 55 and rear wall 56 of the body 50. A shank or stem 57 extends rearwardly from the rear wall 56 of the body 50 and has formed therein a longitudinally extending socket 58 which opens through the rear end wall of the stem and tapers towards the rear wall 56 in which it terminates in a closed bottom 59 of conical shape.

The taper of the socket conforms to that of the tip section 12 of the rod and the conical bottom 59 of the socket conforms to the shape of the tip end of the section 12 so that the stem 57 and the body 50 are frictionally and tightly held upon the section 12 of the fishing rod 10. The body 50 and the stem 57 are formed of a suitable plastic, such as a synthetic resin or cast nylon, that is a synthetic linear condensation polyamide.

An insert or bushing 60 is disposed within the opening 51 of the body 50 and is made of any suitable wear resistant material, such as stainless steel. The insert is of substantially the same shape as that of the body 50 and has a through opening therein corresponding in size and shape to the opening 51 and its upper wall 61 is secured to the inner face of the upper wall 54 of the body 50, its side walls 62 are secured to the inner faces of the body side walls 55 and its rear wall 63 is secured to the inner face of the body rear wall 56. The insert may be secured to the body 50 by casting the nylon body upon the insert or the nylon body may be first cast and then the insert secured thereto in any suitable manner, as by an appropriate adhesive or the like. The free edge portions of the walls of the insert 60 are rolled or peened over the adjacent and corresponding edge portions of the body 50, as indicated at 64, to cover and protect these edge portions of the body 50.

The side walls 55 and 62 of the body 50 and insert 60 have aligned apertures 65 therethrough for the reception of a grooved roller or pulley wheel 66 which is disposed within the opening of the insert. The roller is mounted for rotation on a hollow shaft 67 and a bearing 68 is interposed between the roller and the shaft. A button or disk 69 is positioned in the aperture 65 of each side wall 55 and engages the roller, the hollow shaft and the bearing.

A securing element 70, such as a screw has its threaded shank extending through a suitable hole in each button and is received by interior screw threads 71 formed on the inner surface of the hollow shaft 67. The head of each screw 70 is received by a countersink 72 formed in each button 69. Each button is stepped to engage the wall of aperture 65 in its side wall 55 and to provide an inwardly facing annular flange 73 which engages the outer face of the portion of its side wall 55 surrounding the aperture 65 to prevent inward movement of the buttons 69. The side walls 55 and 62 overlie and engage a portion of the periphery of the roller 66. With this arrangement, the roller assembly is held in proper position against axial and radial displacement. The upper periphery of the roller 66 and the side walls 62 and the upper wall 61 of the insert 60 define a passageway 74 for the fishing line 17.

In the use of the device, one or more of the roller guide assemblies 18 will be mounted upon the upper side of the fishing rod 10 at longitudinally spaced intervals and the roller top assembly 19 will be secured to the tip end section 12 of the rod with the body 50 extending upwardly, as illustrated in Figure 1 of the drawing. The free end portion of the fishing line 17 will be passed through the passageway 32a of each assembly 18 in succession, beginning with the assembly 18 nearest the reel 16. The fishing line 17 will be extended from the last assembly 18 through the passageway 74 of the assembly 19. If desired, the assemblies 18 and 19 may be mounted upon the lower side of the fishing rod. As the fishing line is paid out or reeled in, it will run freely over the rollers 42 and 66 and the inserts 32 and 60 will prevent the fishing line from contacting the relatively softer nylon bodies 20 and 50 so that the wear incident to the friction induced by the running fishing line will be taken by the metal inserts rather than by the nylon bodies.

It will be noted from Figures 6 and 7 of the drawing that the insert 60 covers the entire inner surface of the body 60 and from Figures 3 and 4 it will be noted that the insert 32 covers substantially the entire inner surface of the body 20 and that the peened over portions 38 of the insert extends a substantial distance below the upper periphery of the roller 42.

It is obvious that various changes and modifications may be made in the details of construction and design of the above specifically described embodiment of this invention without departing from the spirit thereof, such changes and modifications being restricted only by the scope of the following claims.

What I claim is:

1. A roller guide assembly comprising a substantially triangularly shaped body provided with a through opening of substantially oblong shape in cross section having side walls, a bottom and an upper wall with the bottom forming the base and the upper wall the truncated apex of the triangle, legs and feet on the base of the body for supporting the assembly from a fishing rod, said body, legs and feet being formed of plastic to minimize interference with the flexibility of the rod, a wear resistant bushing positioned within the opening, and a roller journaled through said side walls and bushing and rotating in the direction of the through opening.

2. A roller guide assembly comprising a body of plastic material having a through opening and provided with integral legs and feet for spacing the body away from a fishing rod, said body having side walls, a bottom and an upper wall with the bottom wall spaced above the feet, and a bushing of wear resistant material positioned within the opening and having side walls, a bottom and an upper wall fitting respectively within the side walls, bottom and upper wall of the body, and a roller journaled through said body and bushing side walls and rotating in the direction of the opening.

3. A roller guide assembly comprising a plastic body including feet and legs for seating on a fishing rod, said body having a through opening for the line, a bushing forming a wear resistant lining for the opening positioned therein, said body having side walls formed with apertures therethrough, a roller received through an aperture, a hollow internally threaded shaft within the roller, buttons fitted externally against the side walls and having reduced portions fitting the apertures and engaging the sides of the roller, screws fitted through the buttons and engaging the threads of the shaft with the heads of the screws seated in countersunk recesses of the buttons.

References Cited in the file of this patent

UNITED STATES PATENTS

| | | |
|---|---|---|
| 1,959,989 | Reynolds | May 22, 1934 |
| 2,262,300 | Reynolds | Nov. 11, 1941 |
| 2,296,174 | Meisler | Sept. 15, 1942 |
| 2,326,828 | Camp | Aug. 17, 1943 |
| 2,478,131 | Rossi | Aug. 2, 1949 |
| 2,502,846 | Hoffman | Apr. 4, 1950 |
| 2,597,738 | Koos | May 20, 1952 |
| 2,740,221 | Kono | Apr. 3, 1956 |